March 22, 1932. A. NYMAN 1,850,271
ELECTRICAL CONDENSER
Original Filed Sept. 9, 1926   2 Sheets-Sheet 1
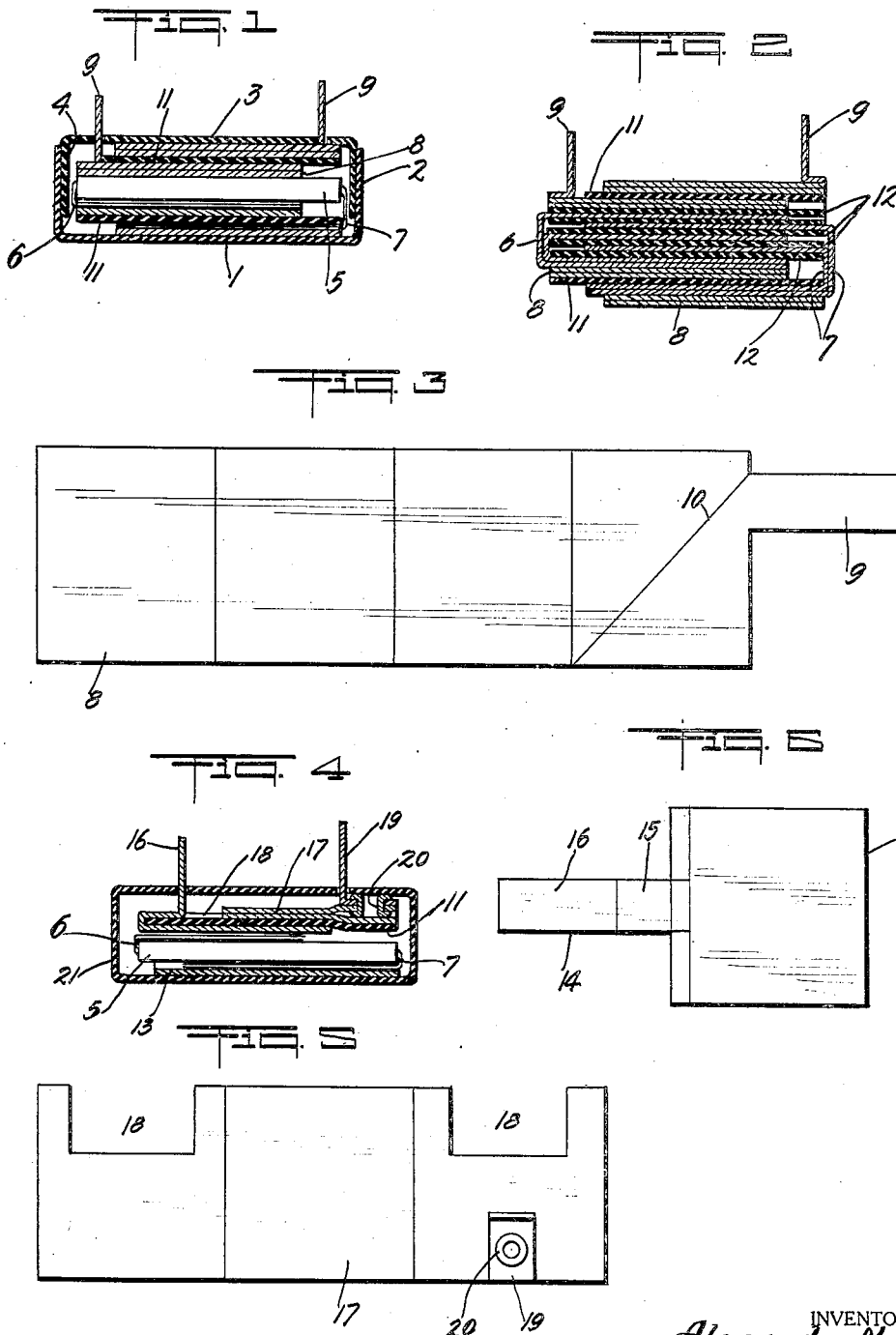

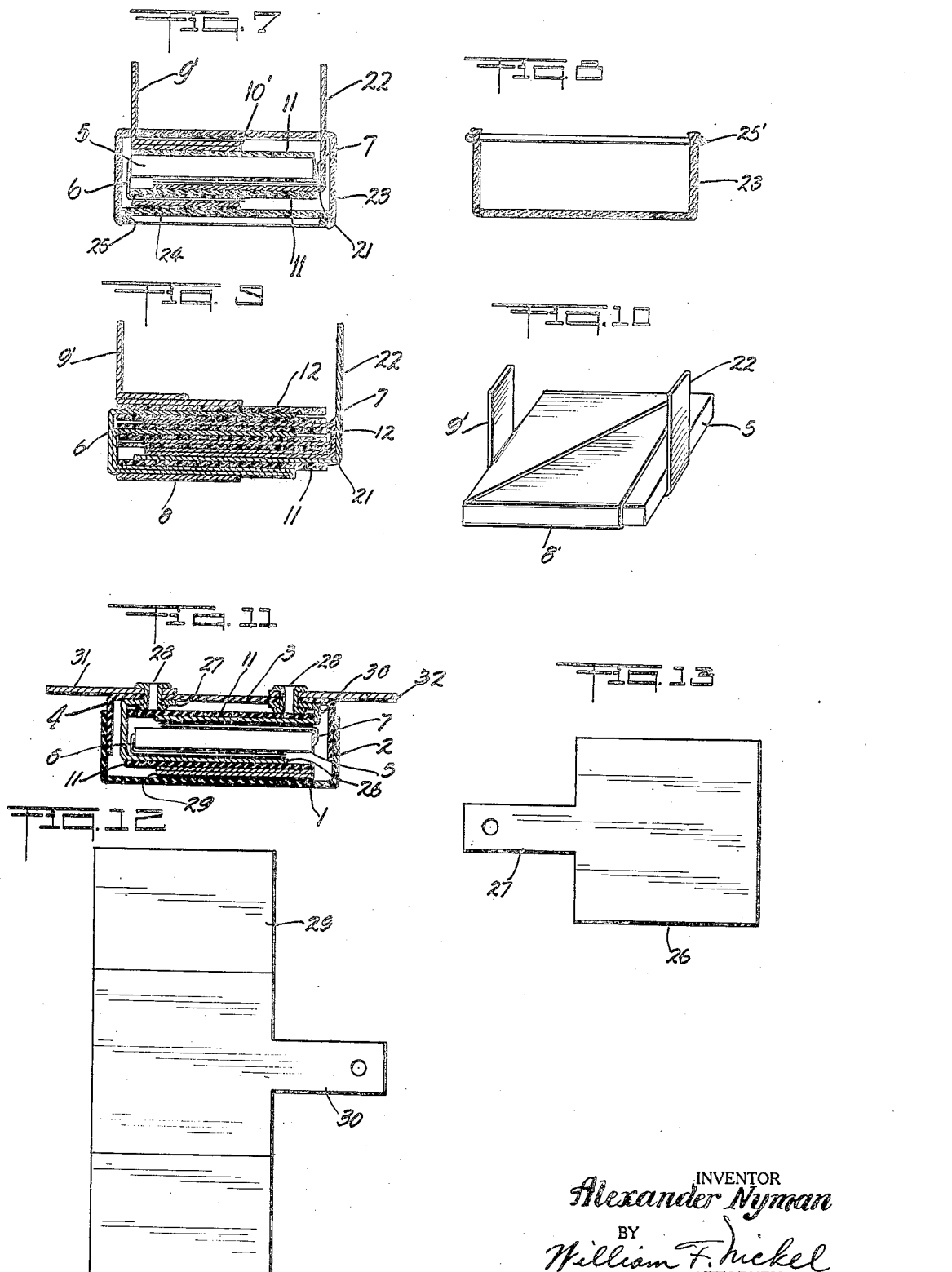

Patented Mar. 22, 1932

1,850,271

UNITED STATES PATENT OFFICE

ALEXANDER NYMAN, OF DOBBS FERRY, NEW YORK, ASSIGNOR TO DUBILIER CONDENSER CORPORATION, OF NEW YORK, N. Y., A CORPORATION OF DELAWARE

ELECTRICAL CONDENSER

Application filed September 9, 1926, Serial No. 134,550. Renewed July 22, 1931.

My invention relates to improvements in electrical condensers; particularly condensers of constant capacity.

An object of the invention is to provide condensers that can be manufactured in large quantities with ease and rapidity, and at comparatively low expense.

A further object of the invention is to provide a condenser which comprises a body or stack around which is wrapped one or more bands, each providing a clamp for the body or stack and furnishing a terminal for the condenser.

A further object of the invention is to provide a condenser which can be conveniently housed in an insulating cover.

Other objects and advantages of the invention will become clear upon the perusal of the following specification, taken with the drawings which disclose one or more embodiments of my invention; and I reserve the right to make changes in the shape, size and arrangement of parts without exceeding the scope or spirit of the invention as the appended claims define same.

On the drawings:

Figure 1 is a longitudinal section of a condenser according to my invention;

Figure 2 is a similar section on a larger scale taken through the body and the clamps therefor with the cover omitted;

Figure 3 is a plan view of a metallic band to be put around the body of the condenser and make a clamp for same;

Figure 4 is a view similar to Figure 1 of another type of condenser according to my invention;

Figure 5 is a view similar to Figure 3 of a band to constitute a clamp for the body of the condenser;

Figure 6 is a plate to be used with the band of Figure 5 to provide a terminal for the condenser of Figure 4;

Figure 7 is a view similar to Figure 1 showing another form of condenser;

Figure 8 is a sectional view to indicate a modified form of casing or housing for the condenser of Figure 7;

Figure 9 is a view similar to Figure 2 of the stack and clamp for the body of the condenser of Figure 7;

Figure 10 is a perspective view of the stack with the terminals and clamps attached;

Figure 11 is a sectional view of a further form of condenser according to my invention;

Figure 12 is a plan view of a band to be wrapped around the stack of the condenser of Figure 11; and Figure 13 is a plan view of a plate to be used with the condenser of Figure 11 to provide a terminal for same.

The same numerals identify the same parts throughout.

Referring first to Figures 1, 2 and 3, I show a casing 1 having sides 2 and closed at the bottom, but open at the top to receive a cover 3 having sides 4 which telescope within the sides 2. This casing with its closure houses the condenser which comprises a body or stack 5 that is made in the usual way to comprise conductive elements of opposite polarity separated by insulation. The conductive elements of one polarity project as shown at 6, and those of the opposite polarity project as shown at 7. The ends 6 are folded over and laid flat against one face of the condenser and a metallic band 8 is wrapped around the body and ends 6 so that the ends are secured beneath this band. Of course, the opposite faces of the stack 5 are made of insulation. The band 8 is shown in developed view in Figure 3 and it has a projection 9. When the band is attached to the stack 5 and wrapped around same, the end carrying the projection 9 is bent over at one corner along the line indicated at 10, and the projection 9 is turned up at right angles to the plane of the band so that the plane of the projection 9 will be perpendicular to the band and parallel to the adjacent side of the band. Then, when the band is wrapped around the stack 5, bending it along the transverse lines shown in Figure 3 to enable it to extend over the opposite sides of the stack 5, the terminal 9 will have an upright position and may project through an opening in the closure 4 so that if a wire or conductor is soldered to the projection 9, connection will be made to the end 6 and the conductive elements of one polarity of the condenser.

On top of the band and over both faces of the stack 5 I then place sheets of insulation 11, and over these sheets of insulation 11 with the stack 5 between them I place a second band 8. The ends 7 of the conductive elements of opposite polarity are bent over upon the outer face of one of the sheets of insulation 11 so as to be beneath the second band 8. This band is exactly like the first band with a projection 9 bent up to extend through an opening in the closure 3 so that when a conductor is attached to this terminal 9, connection can be made to the remaining conductive elements of the condenser.

As shown in Figure 1, the band which makes contact with the projecting ends 6 and the conductive elements of one polarity of the condenser extends only part of the way from the end of the stack whence these ends 6 project to the opposite end so as to be separated by a suitable space from the ends 7, and the band 8 which makes contact with the ends 7 has its adjacent side spaced from the terminal 9 of the first band. This construction permits the stack to be made up and covered with the two bands 8 which not only furnish terminals for the stack, but also act as clamps to hold the parts of the stack in the proper relation with respect to one another. Figure 2 fully illustrates the manner in which the stack is built. The conductive elements having projecting ends 6 are in alternation with the conductive elements having projecting ends 7 and 12 indicate sheets of insulation which separate the conductive elements, one of these sheets 12 lying upon the top and bottom of the stack, while the projecting ends 6 are shown as bent over upon the lower plate of insulation 12. The band 8 which makes contact with the ends 6, encircles the stack and engages the upper plate of insulation 12, while the other band 8 makes contact with the ends 7 and holds the two outer plates 11 of insulation in place upon the first band at the top and bottom face of the stack. When the stack is thus completed, it is put in the housing so that the two terminals 9 project at the top of closure 3, and by means of an adhesive or any other suitable manner, the parts of the housing are secured in place. If desired, the stack can be impregnated with wax or some other insulation, and the housing filled with such insulation.

In Figure 4, the stack 5 is made with the ends 6 folded over on its upper face, and on these ends is placed a plate 13 having a projection 14. The projection 14 may be considered as comprising two sections 15 and 16, one of which projects at the top of the housing and provides a terminal for the condenser. On the plate 13 is laid a sheet of insulation 11, and the ends 7 of the elements of opposite polarity are bent against the bottom face of the stack, and then around the stack and over the plate 11 is wrapped a band indicated at 17. This band has recesses 18 in one side adjacent the opposite ends and it is bent along the transverse lines between these recesses 18, as indicated in Figure 5, so that it can extend over the sides of the stack. The portions of the band having the recesses are turned down on top of the plate 11 with the recesses coinciding so as to provide a space between the edges of this band and the terminal 16. The plate 13 can be bent along the transverse line adjacent the end carrying the projection 14 shown in Figure 6, so that it engages the edge of the plate 11 and then the terminal 14 can be bent so that the section 15 is down against the top of the plate 11 with the second section 16 passing out through the top of the housing. The projection 14 may be cut in to the transverse line above mentioned if desired. To one of the parts of the band 17 lying on the plate of insulation 11, I can attach a projection 19 by means of a rivet 20, and this projection will pass out through an opening in the housing, the same as the projection 16, to provide another terminal for the condenser. The housing may be in one piece or as shown in Figure 1. In Figures 7, 8, 9 and 10 instead of two bands, I can use a band and plate 8' and 21 respectively, and the ends 7 are put under the plate to hold the ends 7 against the bottom of the stack 5, the plate being on the lower face of the stack and having a projection 22 which passes through an opening in the housing to form an outside terminal. Over the plate 21 I place a sheet of insulation 11, and a similar sheet of insulation 11 may be put on top of the stack 5. The ends 6 of the elements of opposite polarity are then bent against one of the plates 11 and around the stack and over the two plates 11 I wind band 8' similar to the band 8 of Figure 3, with a projection 9' at one end and the corner at that end turned over along a diagonal line to enable this projection 9' to be bent upward to extend out through an opening in the housing and have its plane parallel to the plane of the adjacent side edges of the band. Thus, the condenser is provided with two exterior terminals as before. The housing is shown as comprising an insulating casing 23. the terminals 9' and 22 extending through the top, the bottom being open, but closed by a plate 24 held in place by an inside spring 25 which may fit into a groove formed around the inner edge of the casing 23. If desired, instead of this spring 25, an outer turn or loop 25' may encircle the casing 23 around the edge and the bottom, as indicated in Figure 8. Instead of two external plates 11, one on top and one on bottom of the stack 5, I may use only one plate 11 on the bottom over the ends 7 and plate 21 as indicated in Figure 9. One of the outside plates 12 of the body 5 lying between the band 8' and the conductive element of the condenser beneath this plate 12.

Figures 11, 12 and 13 show a condenser made up as before with a casing 1 having sides 2, closure 3 and sides 4 telescoped into the sides 2, the ends 6 turned down against the bottom of the body making contact with the plate 26 having a projection 27, and against the plate 26 is put a sheet of insulation 11. The ends 7 of the conductive elements of opposite polarity are bent down upon the top of the stack 5 and around the stack in contact with the ends 7, and over the sheet of insulation 11 just mentioned is wrapped a metallic band 29. This band has a projection 30, and on the band upon the top face of the stack, is placed another sheet of insulation 11. The projections 27 and 30 are attached by means of eyelet rivets to the closure 3, these eyelet rivets being indicated at 28 and passing through the closure 3 and securing to the plate 26 and band 29 respectively tabs or conductor fastening members 31 and 32, so that the two terminals of the condenser can be connected to an outside circuit. The upper plate 11 separates the projection 27 and adjacent rivet from the band 29.

Having described my invention, what I believe to be new and desire to secure and protect by Letters Patent of the United States is:—

1. A condenser comprising a casing, a stack and plate connected to conductive elements of one polarity in the stack, a band encircling the stack and plate and insulated from the plate and connected to conductive elements of opposite polarity, a casing for the stack, the plate and the band, and terminal members on the outside of the casing riveted to said band and said plate.

2. A condenser comprising a casing enclosing a stack of interleaved armature and dielectric elements, a metallic member associated with the stack and making contact with the armatures of one polarity, a clamping band encircling said stack and member and connected to the armatures of opposite polarity, said member and band each having means for positioning the stack within the casing and for connecting the condenser in circuit.

3. A condenser comprising a casing enclosing a stack of interleaved armature and dielectric elements, a metal plate adjacent one face of the stack and making contact with the armatures of one polarity, a clamping band encircling said stack and plate and connected to the armatures of opposite polarity, insulating means for separating the plate and band, said plate and band each having extending tabs secured to a wall of the casing for positioning the stack and comprising means for connecting the condenser in circuit.

In testimony whereof I affix my signature.
ALEXANDER NYMAN.